3,422,198
N-METHYL 3-METHYL-5-ETHYL PHENYL CARBAMATE AS AN INSECTICIDE
Peter John Brooker, Saffron Walden, Essex, John Gillon, Cambridge, and Geoffrey Tattersall Newbold and David Thomas Saggers, Saffron Walden, Essex, England, assignors to Fisons Pest Control Limited, Harston, Cambridgeshire, England, a British company
No Drawing. Continuation of application Ser. No. 252,558, Jan. 21, 1963. This application Jan. 11, 1967, Ser. No. 608,951
Claims priority, application Great Britain, Jan. 22, 1962, 2,205/62
U.S. Cl. 424—300    1 Claim
Int. Cl. A01n 9/20

ABSTRACT OF THE DISCLOSURE

N-methyl-3-methyl-5-ethyl phenyl carbamate is a highly active aphicide and insecticide. It is effective inter alia in combating the common house-fly (*Musca domestica*).

---

The present application is a continuation of copending application, Ser. No. 252,558, filed Jan. 21, 1963 (which application has been abandoned since the filing of the present application).

The present invention relates to a new insecticide.

It has been found that N-methyl 3-methyl-5-ethyl phenyl carbamate is a highly active aphicide and insecticide.

Accordingly the present invention is for N-methyl-3-methyl-5-ethyl phenyl carbamate.

The N-methyl 3-methyl-5-ethyl phenyl carbamate can be prepared by reacting 3-methyl-5-ethyl phenol with methyl isocyanate. The reaction is suitably carried out under anhydrous conditions.

The N-methyl 3-methyl-5-ethyl phenyl carbamate can also be prepared by reacting 3-methyl-5-ethyl chloroformate with methyl amine. The 3 methyl-5-ethyl chloroformate is suitably prepared by the reaction of 3-methyl-5-ethyl phenol with phosgene.

The present invention is also for an insecticidal composition which contains as an active ingredient N-methyl 3-methyl-5-ethyl phenyl carbamate.

The present invention is also for a composition which contains N-methyl 3-methyl-5-ethyl phenyl carbamate together with one or more materials selected from the group comprising wetting agents and solid diluents.

In insecticidal compositions the N-methyl 3-methyl-5-ethyl phenyl carbamate may be incorporated for example with solid inert media comprising powdered or divided solid materials, for example clays such as china clay, sands, talc, mica, fertilizers and the like; such products either comprising dust or larger particle size materials.

It is preferred however to mix the N-methyl 3-methyl-5-ethyl phenyl carbamate with a wetting agent, with or without the incorporation of powdered or divided solid materials as referred to above, so that a wettable product is obtained which is capable of use as such or as a suspension or dispersion in water.

If desired the N-methyl 3-methyl-5-ethyl phenyl carbamate may be incorporated with an organic solvent together with a wetting or dispersing agent so as to form an emulsifiable liquid concentrate which may be dispersed in water for spraying purposes. Alternatively an aqueous concentrate containing a wetting agent may be prepared.

The wetting agents used may comprise anionic compounds such as for example soaps, fatty sulphate esters such as dodecyl sodium sulphate, fatty aromatic sulphonates such as the amide condensation product of oleic acid and N-methyl taurine or the sodium sulphate of dioctyl succinic acid. The wetting agents may also comprise non-ionic wetting agents such as for example condensation products of fatty acids, fatty alcohols or fatty substituted phenols with ethylene oxide, or fatty esters and ethers of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethylammonium bromide and the like.

If desired the insecticidal compositions according to the present invention may contain in addition to the N-methyl 3-methyl-5-ethyl phenyl carbamate other agricultural chemicals such as herbicides, fungicides, pesticides, plant growth regulants and the like. According to one embodiment of the invention the N-methyl 3-methyl-5-ethyl phenyl carbamate is mixed with other insecticides such as for example DDT, BHC or Sevin and/or with fungicides such as for example copper oxychloride, ethylene-1:2-bisdithiocarbamate salts or thiuram.

The following examples are given to illustrate the present invention. The parts and percentages quoted are by weight.

Example 1

6 parts of 3-methyl-5-ethyl phenol in 20 parts of dry diethyl ether were treated with 3.2 parts of methyl isocyanate and 0.5 part of triethylamine. The crystalline product separated after half an hour. The mixture was allowed to stand for 12 hours and then filtered, and the solid recrystallised from a diethyl ether petroleum mixture giving 6.8 parts of N-methyl 3-methyl-5-ethyl phenyl carbamate in a yield of 80%; melting point 84–85° C.

Found: C, 68.25; H, 7.70; N, 7.55. $C_{11}H_{15}NO_2$ requires: C, 68.37; H, 7.82; N, 7.25%.

Example 2

An aqueous concentrate containing approximately equal amounts of N-methyl 3-methyl-5-ethyl phenyl carbamate and the octyl cresol polyethylene oxide condensation product known as "Lissapol NX" was prepared. This concentrate was suitable for dilution with water.

Example 3

The aqueous concentrate described in Example 2 was diluted with water to a concentration of 1,000 parts per million of the phenyl carbamate. This solution was sprayed at a rate of about 50 gallons per acre onto young plants of the field bean (*Vicia fabae*) infested with adult vetch aphides (*Megoura viciae*), and gave a complete kill of these insects within six hours.

Example 4

The aqueous concentrate described in Example 2 was diluted with water to a concentration of 1,000 parts per million of the N-methyl 3-methyl-5-ethyl phenyl carbamate. This solution was sprayed at a rate of about 50 gallons per acre onto young cabbage plants approximately 3 inches high with 4 true leaves. One day later 10 second instar larvae of the butterfly (*Pieris brassica*) were placed on each plant. 24 hours later all the larvae were dead.

Example 5

Filter papers were treated with an acetone solution of N-methyl 3-methyl-5-ethyl phenyl carbamate at such a rate as to leave, after drying, a deposit of the active ingredient amounting to 30 milligrams per square foot. The papers were placed in petri dishes into which adult house-flies (*Musca domestica*) were introduced. After 24 hours all the flies were found to be dead.

Example 6

75 parts of china clay, 5 parts of sodium dodecylbenzyl sulphonate and 20 parts of N-methyl 3-ethyl-5-methyl phenyl carbamate were ground together in a fluid energy mill to give an insecticidal composition readily dispersible in water.

Example 7

To an ice cold solution of 120 parts of 20% aqueous monomethyl amine were added slowly with vigorous stirring 150 parts of 3-methyl-5-ethyl phenyl chloroformate. The white solid which was precipitated was filtered off and water washed until free from chloride ions. The solid was dried and recrystallised from a 60/80° C. benzene petrol mixture giving N-methyl 3-methyl-5-ethyl phenyl carbamate of melting point 84–85° C. in a yield of 130 parts (90%).

Example 8

Fifty ten day old granary weevil adults (*Callandra granaria*) contained in a metal gauze cylinder 10 centimetres in diameter were sprayed with 2 millilitres of an aqueous suspension of the formulation described in Example 6 containing 1% of N-methyl 3-methyl-5-ethyl phenyl carbamate from a distance of 25 centimetres. After spraying the insects were transferred to a clean cylinder, and when observed after 24 hours all were dead.

Example 9

An aqueous suspension of the formulation described in Example 6 containing 100 parts per million of N-methyl 3-methyl-5-ethyl phenyl carbamate was sprayed onto potato plants about 15 centimetres high until run off. The plants were then allowed to dry and each was infested with 10 fourth instar larva of the Colorado beetle (*Leptinotarsa decemlineata*) of a DDT resistant strain. All the insects were found to be dead after six hours.

What is claimed is:

1. A method of controlling insects which comprises applying thereto an insecticidally effective amount of N-methyl 3-methyl-5-ethyl phenyl carbamate.

References Cited

UNITED STATES PATENTS 3,167,472   1/1965   Czyzewski et al.

FOREIGN PATENTS 223,028   7/1959   Australia.

OTHER REFERENCES

Kolbezen et al.: Journal of Agricultural and Food Chemistry, vol. 2, pp. 864–870 (1954).

ALBERT T. MEYERS, *Primary Examiner.*

J. GOLDBERG, *Assistant Examiner.*

U.S. Cl. X.R.

260—479